United States Patent [19]
Habiger

[11] 3,974,715
[45] Aug. 17, 1976

[54] NULL AND GAIN ADJUSTMENT MECHANISM FOR HYDROSTATIC PUMPS AND MOTORS

[75] Inventor: Cyril W. Habiger, Joliet, Ill.
[73] Assignee: Caterpillar Tractor Co., Peoria, Ill.
[22] Filed: Dec. 9, 1974
[21] Appl. No.: 530,926

[52] U.S. Cl. .............................. 74/571 R; 74/600
[51] Int. Cl.² .................................... G05G 1/00
[58] Field of Search ............... 74/571, 568, 600

[56] References Cited
UNITED STATES PATENTS

| | | | |
|---|---|---|---|
| 349,215 | 9/1886 | Fawcett | 74/571 |
| 2,005,227 | 6/1935 | Johnson | 74/571 |
| 2,592,237 | 4/1952 | Bradley | 74/571 |
| 3,138,037 | 6/1964 | Schumann | 74/568 |
| 3,792,627 | 2/1974 | Tarello | 74/568 FS |

Primary Examiner—Samuel Scott
Assistant Examiner—Wesley S. Ratliff, Jr.
Attorney, Agent, or Firm—Phillips, Moore, Weissenberger, Lempio & Strabala

[57] ABSTRACT

A control linkage for a servo valve of a variable displacement hydraulic machine includes a lever arm adjustably connected to the servo valve by means that is operative to adjust the null position of the valve with respect to the lever, and includes cam means for adjusting the length of the lever arm.

15 Claims, 7 Drawing Figures

NULL AND GAIN ADJUSTMENT MECHANISM FOR HYDROSTATIC PUMPS AND MOTORS

BACKGROUND OF THE INVENTION

The present invention relates to a null and gain adjustment mechanism for individually adjusting the rotary servo valves of a pair of interconnected hydrostatic pumps for zero displacement and for adjusting the fluid output of the pumps so that motors driven thereby are driven at the same rotational speed.

Hydrostatic transmissions are being employed in a variety of vehicles, including track-type vehicles. Such vehicles commonly employ separate hydraulic motors for each track with the hydrostatic transmissions including a pair of variable displacement hydraulic pumps, each of which supplies pressurized fluid to a respective one of the motors. Forward travel of the vehicle is accomplished by varying the displacement of the pumps. The displacement is varied by tilting the swash plates of the pumps in one direction to supply fluid to one side of the hydraulic motors while reverse motion is accomplished by tilting the swash plates over center in the opposite direction for supplying pressurized fluid to the other side of the hydraulic motors. The vehicle speed is determined by the angle of tilt of the swash plates. Steering of the vehicles is normally accomplished by decreasing or increasing the fluid flow to one of the hydraulic motors relative to the other.

One of the problems encountered with such systems is that of providing a mechanism having provision for precise synchronism between the drive motors. The need for synchronism is especially critical when the steering control is in a neutral position for travel of the vehicle in a straight line. Without precise adjustment or position correspondence of the pumps, the vehicle will not travel in a straight line, but will require continuous manipulation of the steering controls by the operator.

One approach to this problem is disclosed in U.S. Pat. No. 3,772,964 issued Nov. 20, 1973, and assigned to the assignee hereof.

SUMMARY AND OBJECTS OF THE INVENTION

It is the primary object of the present invention to provide control means for adjusting the null and gain of a variable displacement machine.

Another object of the present invention is to provide adjustable means for the servo valve of a variable displacement machine.

A further object of the invention is to provide null and gain adjustment means for a pair of controllably interconnected hydraulic machines.

In accordance with the present invention the control linkage for the servo valve of a variable displacement hydraulic machine includes a lever adjustably connected to the servo control valve by cam means that is operative to adjust the null position of the valve with respect to the lever, and to adjust the length of the lever arm.

BRIEF DESCRIPTION OF THE DRAWINGS

The above and other objects and advantages of the present invention will become apparent from the following description when read in conjunction with the accompanying drawings wherein.

DETAILED DESCRIPTION OF THE PREFERRED EMBODIMENT

Figure 1:
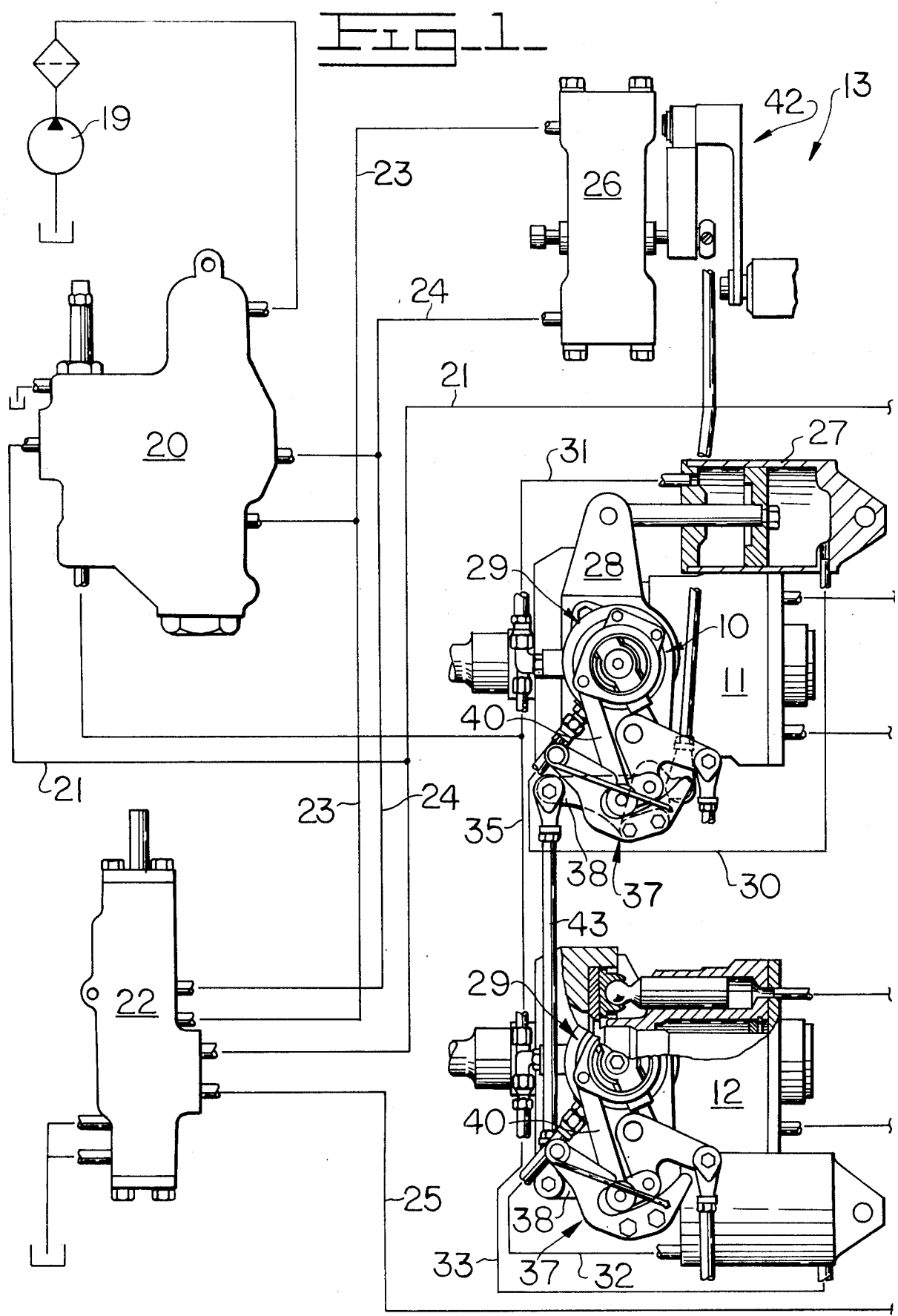
FIG. 1 is a schematic layout of a portion of a control system embodying the present invention.
Figure 2:
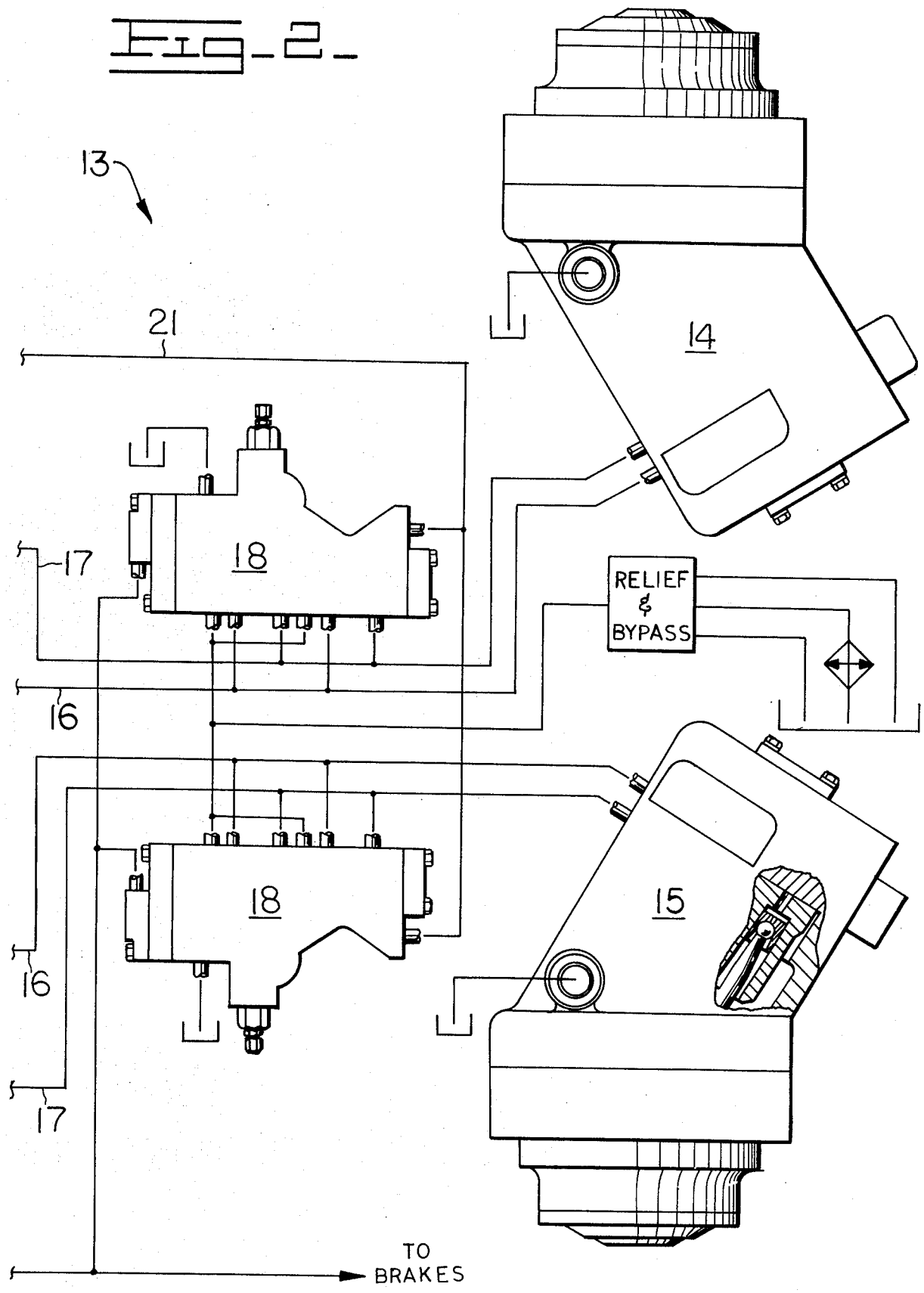
FIG. 2 is a schematic layout of the remainder of the control system of FIG. 1.

Referring now to the drawings, particularly to FIGS. 1 and 2, there is illustrated a null and gain adjustment mechanism in accordance with the invention indicated generally by the reference numeral 10. These mechanisms are generally provided in pairs with each associated with one of a pair of variable displacement over center hydraulic pumps 11 and 12 of a hydrostatic transmission 13. The pumps 11 and 12 are hydraulically connected to a pair of fixed displacement hydraulic motors 14 and 15, respectively, through suitable means such as two pairs of conduits 16 and 17.

A replenishing and relief valve 18 is provided for each pair of conduits and functions in the usual manner to make up or replenish fluid lost from the pumps and motors due to leakage and to relieve excessive pressure in the system above a predetermined value. The make-up fluid is transmitted to the valves 18 from a positive displacement charging pump 19 through a venturi manifold 20 and a line or conduit 21.

A speed control and safety vent valve 22 is connected to the line 21 and communicates with the venturi manifold 20 through a pair of lines or conduits 23 and 24 and with the replenishing and relief valves through a line or conduit 25. The lines 23 and 24 also communicate with opposite ends of an underspeed actuator valve 26.

Each of the pumps 11 and 12 is provided with a double-acting fluid actuator 27 which includes a rod attached to a swash plate 28 for controlling the displacement of the pump and hence the fluid output through the conduits 16 and 17. A rotary servo valve 29 of pump 11 is connected to the head end and rod end of its respective actuator through a pair of conduits 30 and 31, respectively. Similarly, the servo valve of pump 12 is connected to the rod end and head end of its respective actuator by conduits 32 and 33.

Figure 4:
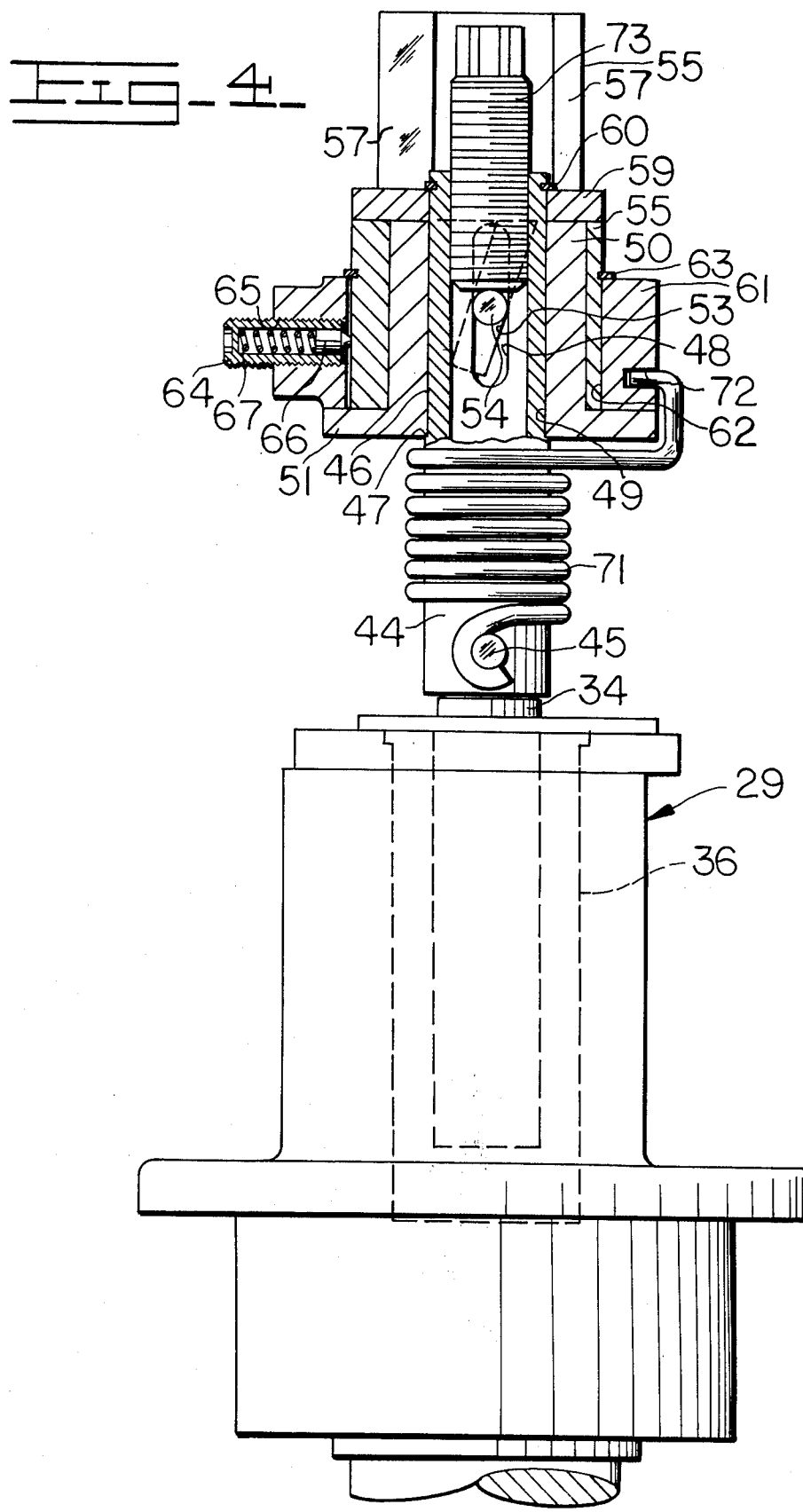
FIG. 4 is a view taken generally along lines IV—IV of FIG. 3.

The rotary valve is of the usual type having a rotary valve spool 34 (see FIG. 4) rotatably disposed therein for controlling fluid flow to the actuator. Rotating the spools of both pumps counterclockwise results in directing fluid through conduit 31 to retract the actuator of pump 11 and through conduit 33 to extend the actuator of pump 12 pivoting the swash plates 28 in a clockwise direction to drive the motors 14 and 15 in a forward direction. Conversely, clockwise rotation of the valve spools results in extension of the actuator of pump 11 and retraction of the actuator of pump 12 for rotating the swash plates in a counterclockwise direction for reverse operation of the hydraulic motors. Actuating fluid is transmitted to the servo valve through a line or conduit 35 from the venturi manifold 20.

The servo valve also includes a follow-up sleeve valve 36 responsive to movement of the swash plate so that the amount of pivoting of the swash plate is determined by the rotational position of the valve spool 34.

Each of the pumps includes a control linkage arrangement 37 (see FIGS. 1 and 3) for positioning the valve spool 34 of the servo valve 29 through the null and gain adjuster mechanism 10. The linkage is fully described in my copending application Ser. No. 530,942, filed simultaneously herewith and entitled CONTROL LINKAGE FOR HYDROSTATIC TRANSMISSIONS. For an understanding of the present invention, it will suffice to state that clockwise rotation of a lever 38, FIG. 3, about its pivot 39 causes a link 40 to impart clockwise rotation to the null and gain adjuster mechanism, and thus, the valve spool 34, while counterclockwise rotation of the lever imparts counterclockwise rotation to the valve spool. Manual input to the lever is transmitted through a link 41 which has one end pivotally attached to one end of the lever 38 and its other end pivotally attached to a manually operable lever arrangement 42, FIG. 1, associated with the underspeed actuator 26. A link 43 is connected between the other end of the lever 38 of the pump 11 to the lever 38 of pump 12 so that the levers and thus the valve spools of both pumps rotate in unison. The control linkage arrangement is resiliently urged to the neutral position shown in the usual manner.

Figure 5:
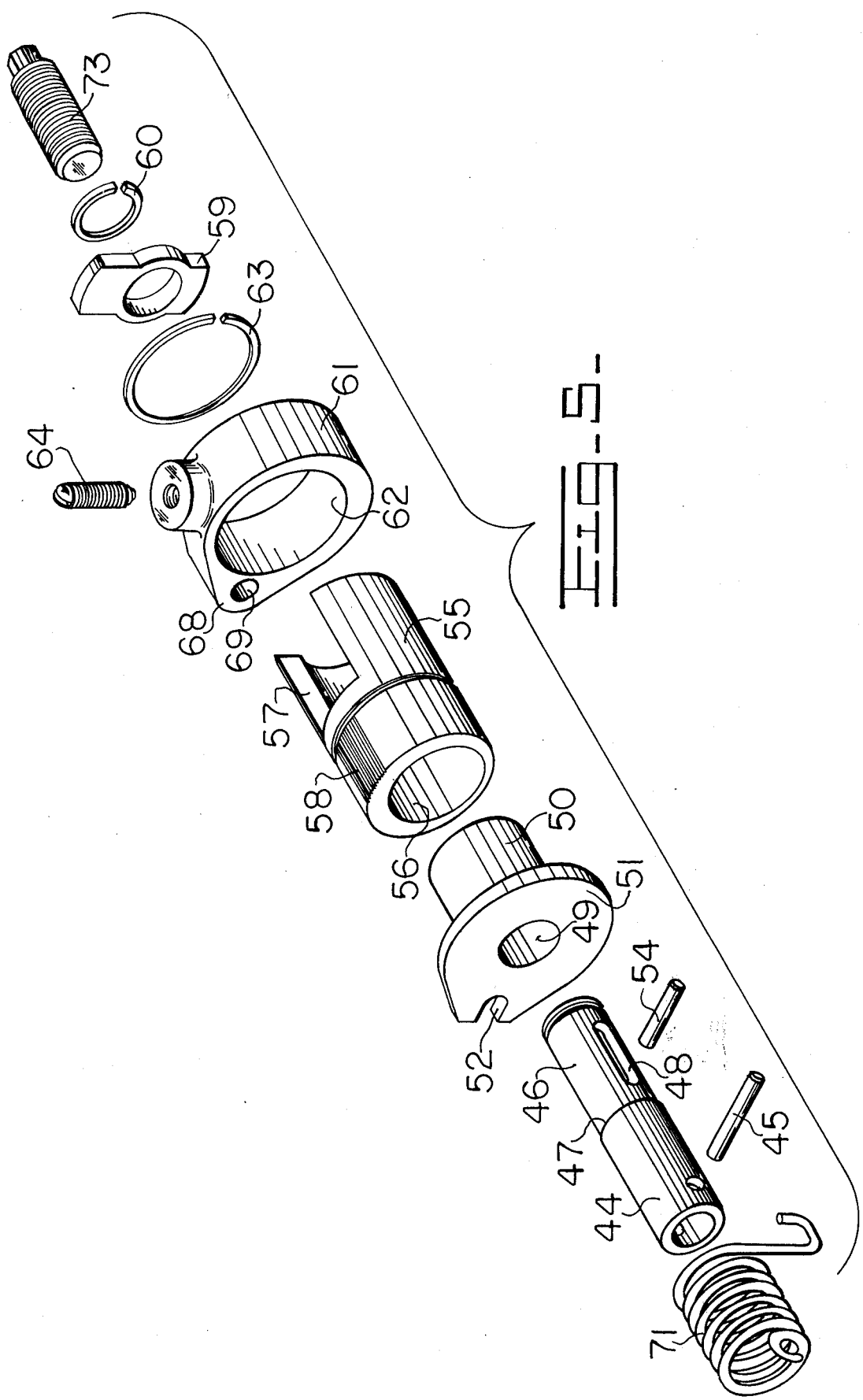
FIG. 5 is an exploded view of the adjusting mechanism of FIG. 4.

The null and gain adjustment mechanism is identical with respect to both pumps only one of which mechanisms is described in detail. As more clearly shown in FIGS. 3, 4 and 5, the null and gain adjustment mechanism includes an elongated tubular member 44 having its lower end secured to the valve spool 34 of the servo valve 29 by a pin 45. A reduced-diameter portion 46 is provided on the opposite end and forms an annular shoulder 47. An axial elongated slot 48 extends transversely through the wall of the tubular member 44 adjacent to its upper end. The reduced-diameter portion 46 extends through a bore 49 formed in a bushing 50 which has its lower end in abutment with the annular shoulder. The bushing has a flange 51 extending radially outwardly with the flange having an outwardly opening notch 52 formed in its periphery. A slot 53 is formed in one side of the bushing 50 and angled relative to the longitudinal axis thereof to function as a cam. A pin 54 extends through the slot in the tubular member with one end protruding into the slot 53 to function as a cam follower.

An elongated eccentric sleeve 55 has an axially extending bore 56 offset from the longitudinal axis thereof. The sleeve 55 is mounted on the bushing 50 for relative rotation therebetween. The sleeve includes a transverse slot 57 formed in its upper end and a plurality of longitudinally aligned serrations 58, FIG. 5, formed on one section of the outer surface adjacent to its lower end. The lower end of the sleeve 55 rests on the flange 51 of the bushing 50 with the sleeve, bushing and tubular member being axially interlocked by an elongated retainer 59 which engages the upper end of the bushing with its opposite ends extending into the slot 57 of the sleeve 55. The retainer 59 is retained on the tubular member by a snap ring 60.

An eccentric collar 61 has a radially offset axially extending bore 62 and is mounted for limited rotation on the lower end of the eccentric sleeve 55 between the flange 51 and a snap ring 63 seated in a groove in the eccentric sleeve. A detent 64 is threadably secured within a readily extending threaded hole 65 in the collar 61 and includes a plunger 66 resiliently urged into engagement with the serrations 58 by a spring 67. The detent maintains the sleeve is a preselected position relative to the collar 61. The collar 61 includes a radially outwardly extending arm or bracket 68 formed thereon and an axially extending bore 69 formed therein. The passage receives a pin 70, FIG. 3, for pivotally connecting one end of the link 40 to the collar. The pin extends through the slot 52 in the flange 51 of the bushing 50 for maintaining a fixed relation between the collar and the bushing.

A coiled torsion spring 71 circumscribes the tubular member 44 below the bushing 50 and has one end fastened to the pin 45 while the other end engages a hole 72 in the periphery of the collar 61. This applies a resilient torque force to collar 61 and bushing 50 relative to the tubular member 44 to eliminate all slack in the mechanism and maintains the pin 54 in contact with the lower end of an adjusting screw 73 adjustably threaded into the upper end of the tubular member 44.

In operation the relative rotational position of the valve spool 34 of the servo valve 29 is adjusted with respect to the control linkage arrangement 37 in order to provide a corresponding null or zero position of the swash plate. The adjustment is accomplished by setting the control linkage arrangement in its neutral position and rotating the adjusting screw 73 in the appropriate direction until the pump is in the zero displacement position. For example, clockwise rotation of adjusting screw causes it to advance into the tubular member 44 forcing the pin 54 downwardly. Since the rotational position of the bushing 50 is fixed by virtue of its connection to the link 40 by the pin 70, the pin 54 follows the angle of the slot 53 in the bushing 50 and translates the downward movement into a rotational movement causing the tubular member 44 to rotate in a counterclockwise direction. The torque applied by the spring 71 maintains contact between the pin 54 and the adjusting screw 73. Conversely, rotating the adjusting screw 73 in a counterclockwise direction retracts it from the tubular member permitting the spring 71 to force the pin 54 upwardly within the angled slot 53, which imparts a clockwise rotation to the tubular member 44 and thus the valve spool 34. The adjustment screw is adjusted until the swash plate is positioned to provide zero displacement of the pump. Adjusting the null of one pump does not affect the null adjustment of the other pump.

The gain or sensitivity adjustment is accomplished by rotating the eccentric sleeve 55 relative to the collar 61 and bushing 50. This may be accomplished by inserting an appropriate tool into the slot 57 of the eccentric sleeve and rotating it in the appropriate direction overcoming the frictional force exerted by the detent 64. The effect of rotating the eccentric sleeve relative to the collar is to change the length of effective lever arm of the pin 70 relative to the axis of the null and gain adjustment mechanism. For example, rotating the eccentric sleeve clockwise increases the radial distance between the pin and the axis of the null and gain adjuster and will decrease the degree of movement of the spool 34 with a given amount of liner movement of the link 40. Conversely, counterclockwise rotation of the eccentric sleeve 55 relative to the collar 61 shortens the effective lever arm and increases the degree of movement of the spool 34 with a given amount of input from link 40. As with the null adjustment adjusting the gain of one pump does not affect the gain of the other pump.

Figure 6:
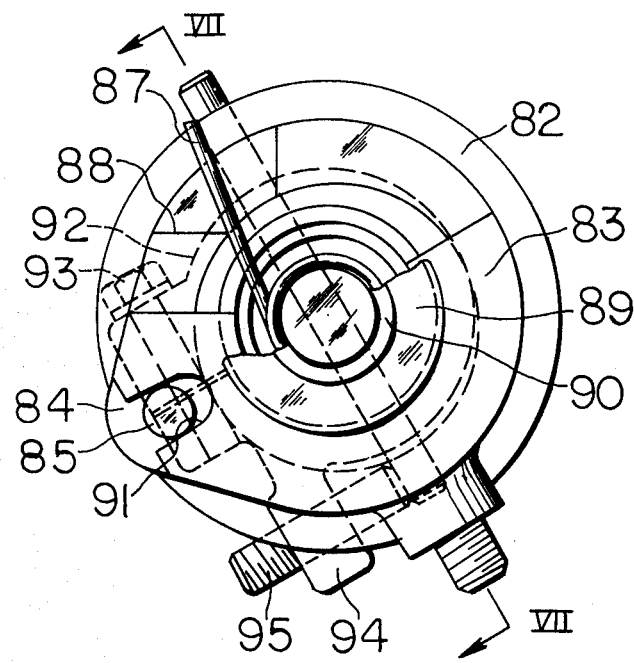
FIG. 6 is a view like FIG. 3 of an alternate embodiment of the invention.
Figure 7:
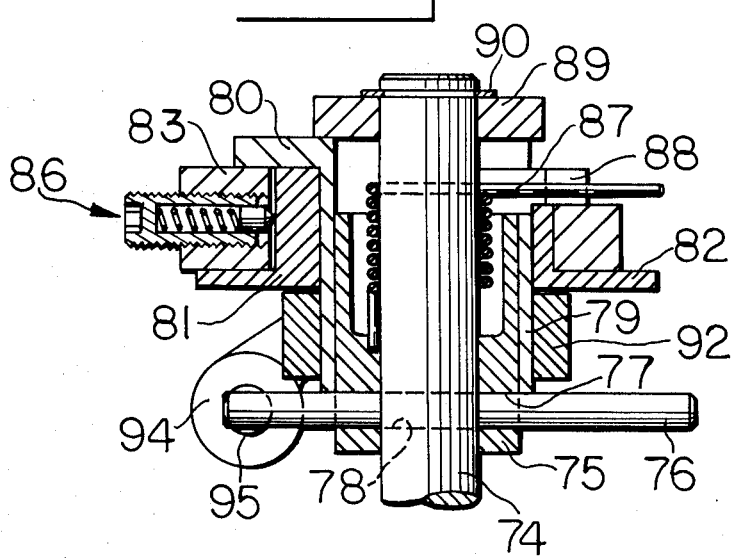
FIG. 7 is a sectional view taken generally along lines VII—VII of FIG. 6.

Turning now to FIGS. 6 and 7, an alternate embodiment is illustrated which functions in somewhat the same manner as the previous embodiments. In the illustrated embodiment a shaft 74 is connected in a suitable manner to a rotary servo valve of a hydraulic machine such as a pump or motor and operatively mounted therewith for rotary or oscillatory motion about its axis for operating the servo valve. A suitable adapter 75 is suitably mounted on shaft 74 such as by means of an elongated pin 76 which extends through a bore 77 in an adapter 75 and a bore 78 in shaft 74. The pin 76 also extends beyond the outer diameter of the adapter 75 to provide stop means, as will be more specifically described below. A bushing 79 having a flange portion 80 is mounted on the outer diameter of adapter 75 for relative rotation therewith and supports on its outer diameter an eccentric sleeve 81.

Figure 3:
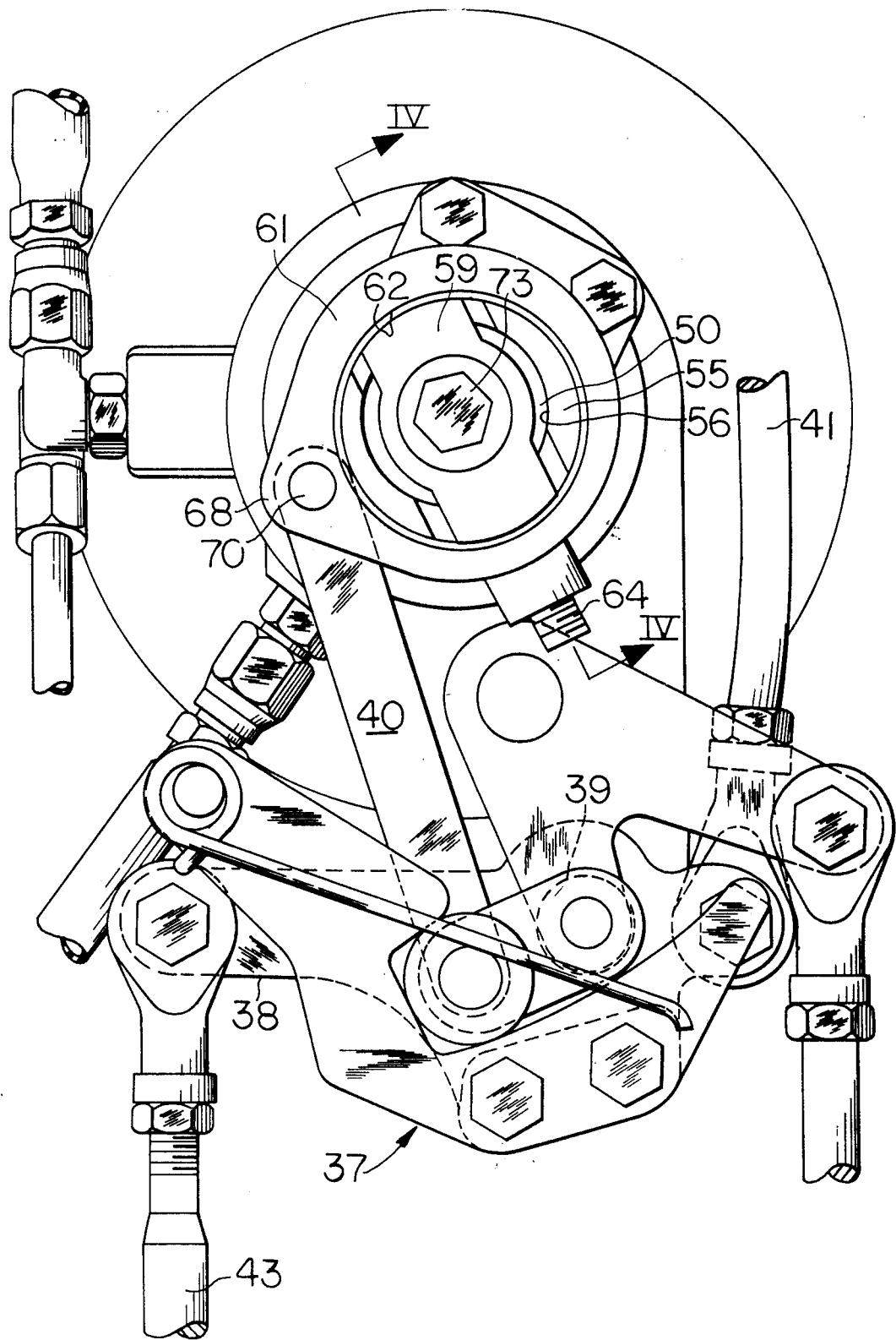
FIG. 3 is a detailed view of a portion of the system of FIG. 1.

The eccentric sleeve 81 includes a lower flange 82 which aids in supporting a collar 83 which includes means defining a lever arm 84 to which is pinned by means of a suitable pin 85 an actuating link member such as 40 shown in FIG. 3. A suitable detent mechanism 86, substantially identical to the one previously described, operates between the collar member 83 and the eccentric sleeve 81 to tend to retain them in the same relative position. A torsion spring 87 is mounted on shaft 74 and includes a lower end extending into a slot or hole in adapter member 75 and an upper end extending outward through a slot 88 formed in the collar 83. This tends to retain the collar 83 in a specified position relative to the sleeve 81. This entire assembly is retained on shaft 74 and adapter 75 by means of a suitable washer 89 at the upper end thereof engaging the upper end of bushing 79 and retained in place by a suitable retaining ring 90. The pin 85 mounted on lever arm 84 extends through a slot 91 formed in flange 80 of the bushing 79. In this manner rotation of the eccentric sleeve 81 causes the pin 85 to move radially inward or outward relative to the axis of the shaft 74 to change the effective lever arm of the pin.

The null position, which is the relative angular position of the pin 85 with respect to the valve which is actuated by the shaft 74, is adjusted by means of an adjusting device comprising a split ring or collar 92 which is clamped by means of a bolt 93 to the outside of bushing 79. The split collar 92 includes an extension portion 94 in which is threadably mounted a screw 95 which extends outward through the portion 94 and engages the pin 76. Thus, extension of the screw 95 rotates the assembly with respect to the shaft 74 and adjusts the null position of the mechanism.

The gain of the mechanism is adjusted by rotation of the eccentric sleeve 81 with respect to the bushing 79 and collar 83 to thereby cam the collar 83 outward or inward, as the case may be, on the side thereof on which is mounted the pin 85. This, therefore, adjusts the lever arm of the mechanism with respect to the shaft 74 and thus the gain of the mechanism.

While the present invention has been described and illustrated by means of specific embodiments, it is to be understood that numerous changes and modifications may be made therein without departing from the spirit and scope of the invention as defined in the appended claims.

I claim:

1. Adjustable control means for a rotatable servovalve comprising in combination:
   a rotatable servovalve mounted for rotation about an axis;
   a lever mounted for pivotal movement about said axis and adjustably connected to said servovalve for rotation of said valve upon pivotal movement of said lever about said axis, said lever including an arm extending away from said axis and link connecting means near the outer end of said arm for connecting actuating link means thereto and for defining with said axis the effective lever arm thereof;
   first means for adjusting the angular position of said servovalve with respect to said lever; and,
   second means for adjusting the effective lever arm of said lever.

2. The adjustable control assembly of claim 1 wherein said first means comprises cam means comprising first and second relatively rotatable connected respectively to said servo valve and said lever;
   one of said members including an axially extending cam face;
   the other of said members including a cam follower member engaging said cam face and means for adjustably forcing said follower along said cam face to cause relative rotation between said members.

3. The control assembly of claim 1 wherein said second means includes cam means comprising a rotatable eccentric sleeve mounted between said lever and said servo valve so that rotation of said sleeve adjusts the length of said lever arm relative to said valve.

4. The valve control assembly of claim 1 comprising:
   a first sleeve connected to said servo valve and extending axially thereof;
   a second sleeve mounted on and coaxial with said first sleeve;
   a slot formed in each of said first and said second sleeves and having portions overlapping, said slots extending in an axial direction, one of said slots extending at least partially circumferentially of one of said sleeves;
   a pin extending through said slots and operative upon axial movement along said slots to cam said sleeves relative to one another; and
   means for moving said pin along said slots.

5. The control assembly of claim 4 wherein said means for moving said pin comprises a screw threadably engaging said first sleeve.

6. The control assembly of claim 4 comprising a torsion spring connected between said first and said second sleeves for biasing said sleeves in one direction relative to one another.

7. The control assembly of claim 6 comprising a third sleeve mounted on said second sleeve and having an eccentric bore;
   said lever comprises a body portion having a bore receiving said eccentric sleeve and rotatably mounted thereon; and
   detent means for resisting movement of said lever relative to said eccentric sleeve.

8. The control assembly of claim 2 wherein said second means comprises a rotatable eccentric sleeve mounted between said lever and said servo valve so that rotation of said sleeve adjusts the length of said lever arm relative to said valve.

9. The valve control assembly of claim 3 wherein said first means comprises:

a first sleeve connected to said servo valve and extending axially thereof;

a second sleeve mounted on and coaxial with said first sleeve;

a slot formed in each of said first and said second sleeves and having portions overlapping, said slots extending in an axial direction, one of said slots extending at least partially circumferentially of one of said sleeves;

a pin extending through said slots and operative upon axial movement along said slots to cam said sleeves relative to one another; and means for moving said pin along said slots.

10. The control assembly of claim 9 wherein said means for moving said pin comprises a screw threadably engaging said first sleeve.

11. The control assembly of claim 3 wherein said first means comprises a first arm connected for rotation with said servo valve;

a second arm connected for rotation with said lever; and an adjusting screw extending between said levers for adjusting the angular position of one of said arms with respect to the other of said arms.

12. The control assembly of claim 3 including detent means operatively connected between said lever and said eccentric sleeve.

13. The control assembly of claim 11 comprising detent means operatively connected between said lever and said eccentric sleeve.

14. The control assembly of claim 3 including torsion spring means connected between said lever and said servo valve for urging said lever toward a predetermined position with respect to said servo valve.

15. The control assembly of claim 11 including torsion spring means connected between said lever and said valve for urging said lever to a predetermined position with respect to said valve.

* * * * *

UNITED STATES PATENT AND TRADEMARK OFFICE
CERTIFICATE OF CORRECTION

PATENT NO. : 3,974,715

DATED : Aug. 17, 1976

INVENTOR(S) : Cyril W. Habiger

It is certified that error appears in the above-identified patent and that said Letters Patent are hereby corrected as shown below:

Column 6, Claim 2, line 20, after "rotatable", --members-- should be inserted.

Signed and Sealed this

Twenty-ninth Day of March 1977

[SEAL]

Attest:

RUTH C. MASON
Attesting Officer

C. MARSHALL DANN
Commissioner of Patents and Trademarks